Dec. 20, 1949          C. R. HALL          2,491,731
FISHHOOK SETTING MEANS
Filed June 16, 1948                    2 Sheets-Sheet 1
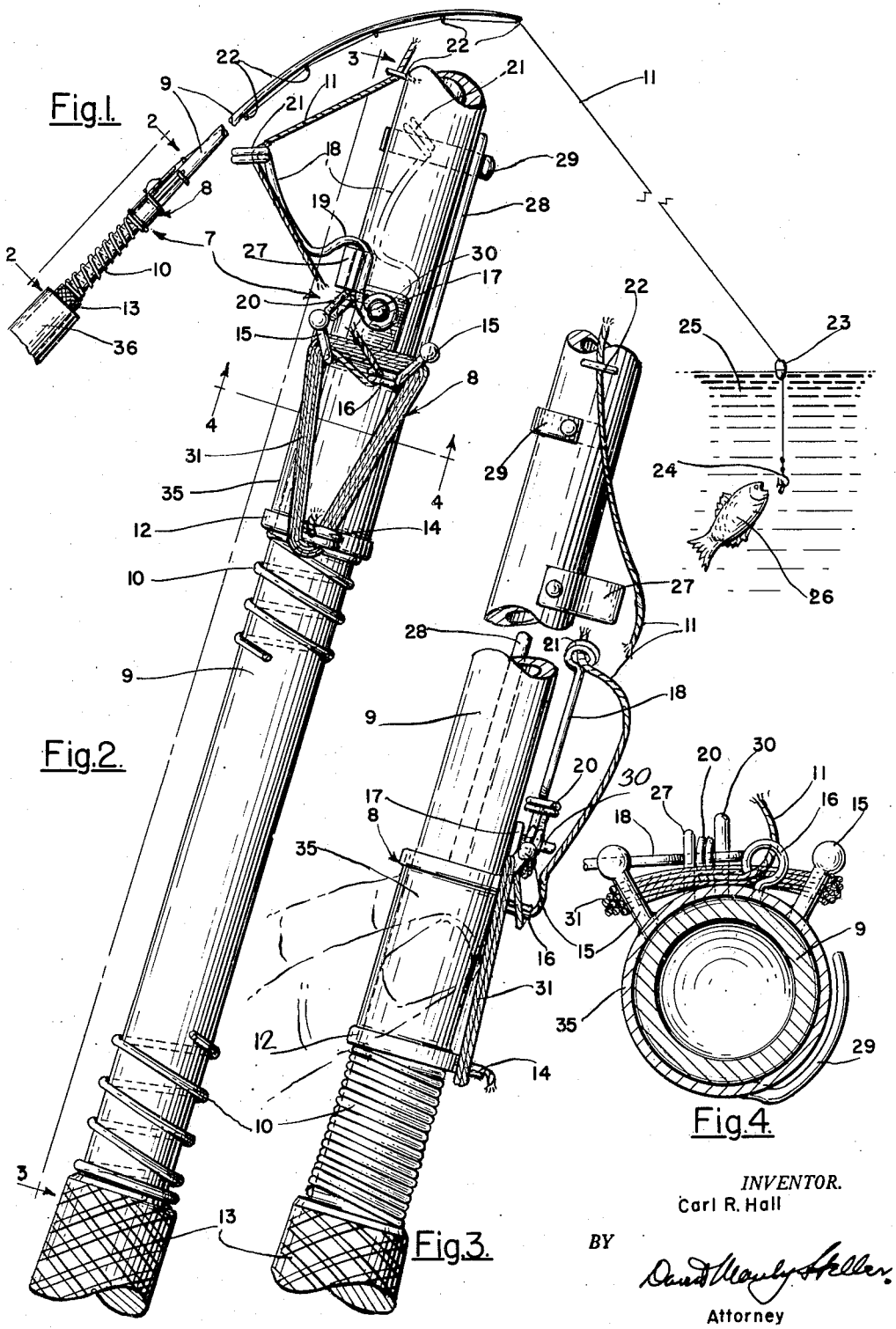
INVENTOR.
Carl R. Hall
BY
Attorney Dec. 20, 1949  C. R. HALL  2,491,731
FISHHOOK SETTING MEANS
Filed June 16, 1948  2 Sheets-Sheet 2

INVENTOR.
Carl R. Hall
BY
Attorney

Patented Dec. 20, 1949

2,491,731

UNITED STATES PATENT OFFICE 2,491,731

FISHHOOK SETTING MEANS

Carl R. Hall, Chicago, Ill.

Application June 16, 1948, Serial No. 33,336

6 Claims. (Cl. 43—15)

My invention relates to fish-hook setting devices with particular relation to use in connection with fish poles.

An important object of my invention, is to provide a fish-hook setting device, which used in connection with a fish pole permits fishing; wherein the fish is hooked when it strikes the baited hook.

A further object of my invention is to provide a fish-hook setting device in which the attaching end of the fish line is secured to a sleeve mounted near the handle of the said fish pole, which in connection with a tension spring and sleeve locking means will provide the means for hooking a fish, when the said sleeve locking means has been tripped by a fish taking the bait.

A still further object of my invention, is to provide in a fish-hook setting device, a self-locking trip arm, together with locating bar and guide strap, to insure quick setting for the said fish-hook setting device.

A still further object of my invention, is to provide a modification to the sleeve locking means in which the trip arm is manually set into locking position.

A further object of my invention, is to provide a fish-hook setting device, that is simply designed and may be economically manufactured in large quantity.

Other objects and advantages embraced in my invention will be disclosed in the following description and in the accompanying illustrations in which like parts are designated by like numerals, and in which:

Fig. 1 is a view of my invention shown in connection with a fish pole mounted, with the fish line, float and hook shown in their proper position.

Fig. 2 is an enlarged fragmentary view of my invention, looking in the direction of lines 2—2 on Figure 1, showing the sleeve locking means in operative position.

Fig. 3 is a fragmentary side view of my invention, looking in the direction of lines 3—3 on Figure 2.

Fig. 4 is an enlarged cross sectional view of my invention taken substantially on lines 4—4 on Figure 2.

Figure 5:
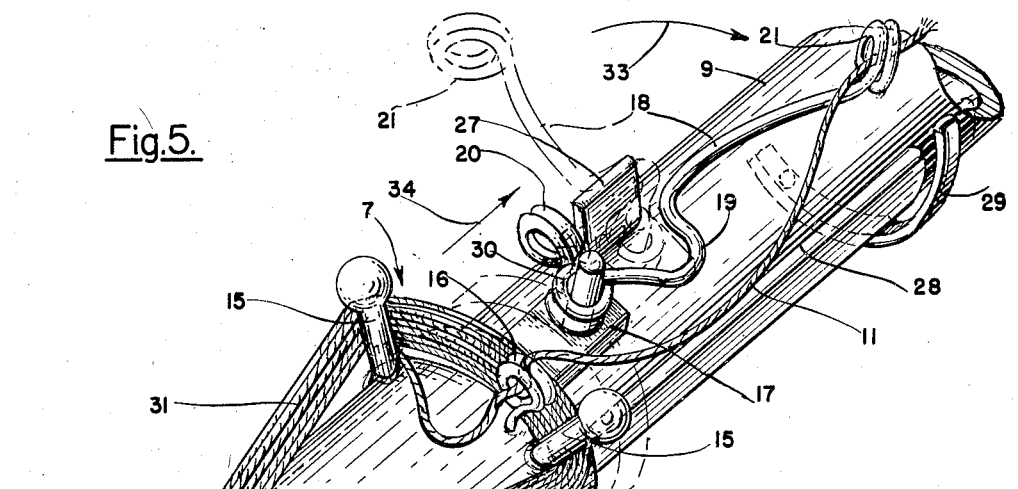
Fig. 5 is an enlarged perspective view of the sleeve locking means comprising a part of my invention.

Referring to the illustrations, my invention is generally designated 7, and consists of sleeve locking means 8, fish pole means 9, tension spring means 10, and fish line means 11. The sleeve locking means 8 consists of a sleeve 35, mounted upon the shank of a fish pole 9, near the handle 13. Said tension spring 10, is mounted on fish pole 9, between the handle portion 13 and a shoulder portion 12 of sleeve 35. A fish line attaching eye 14 secured on shoulder portion 12 provides attaching means for the end of a length of spare fish line 31, which is conveniently wound upon fish line winding posts 15 mounted upon sleeve 35 as shown in Figure 2.

The trip arm attaching plate 17 is formed as an extension of sleeve 35, and serves as mounting means for trip arm mounting post 30. Trip arm means 18 is rotatably mounted upon trip arm mounting post 30 and has a locking hump portion 19, which together with a latch engaging portion 20 serves as engaging and locking means with latch means 27. The said latch means 27 is fixedly attached to fish pole 9, as best shown in Figure 3.

An elongated locating bar 28 is attached to sleeve 35, and serves in connection with guide strap 29 attached to pole 9, to locate and guide the sleeve locking means 8 in its locking engagement with latch means 27.

Fish line means 11, is secured by fish line clamping eye 16 and then threaded through fish line guide portion 21, on the end of trip arm means 18. The said fish line means 11 is supported in the usual manner by fish line stringing guides 22 on pole 9, and is provided with float means 23, and fish hook means 24 attached to its free end.

Figure 6:
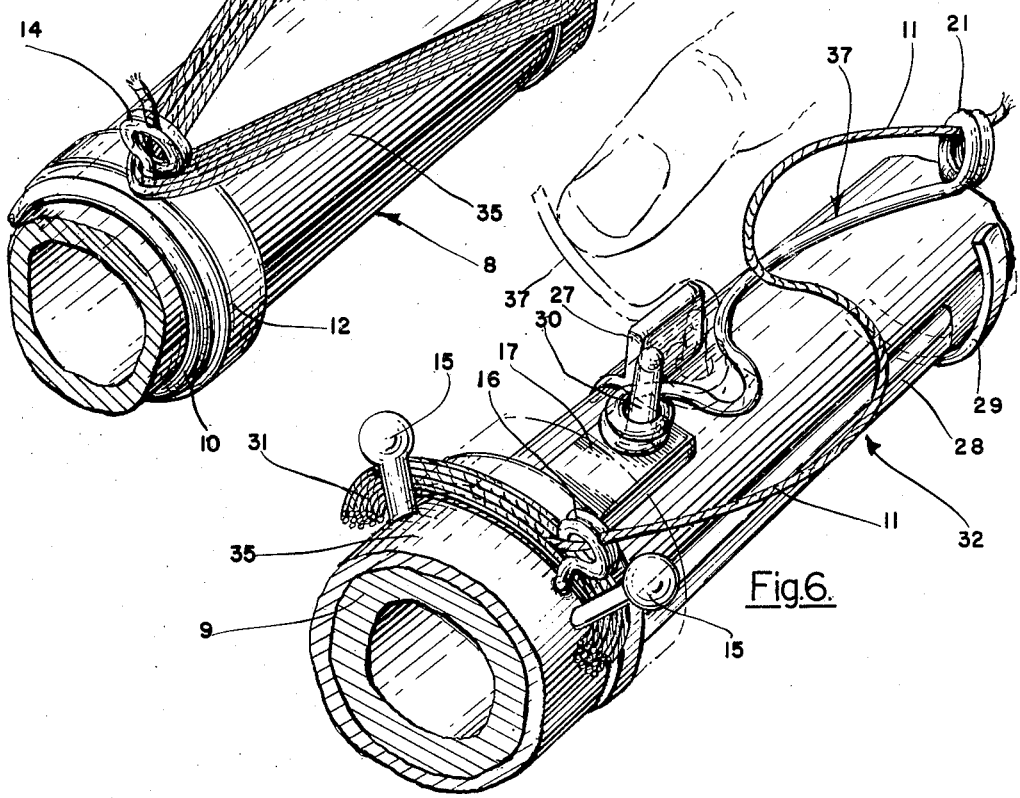
Fig. 6 is a perspective view of a modification of the sleeve locking means.

A modification to the sleeve locking means 8 is designated 32 and illustrated in Figure 6. The said modification 32 is similar to the above described sleeve locking means 8 as illustrated in Figure 5, except that it is not provided with a latch engaging portion 20. It is therefore necessary to manually engage trip arm means designated 37 as shown in phantom lines in Figure 6.

To operate my fish-hook setting device for fish poles, the automatic sleeve locking means 8 is grasped by thumb and finger as shown in Figure 3, and moved in the direction of arrow 34 in Figure 5, until the latch engaging portion 20 engages latch means 27, as shown in Figure 2, causing trip arm means 18 to rotate to a locked position with locking hump portion 19 engaging latch means 27. Simultaneously, locating bar 28 engages guide strap 29, to prevent said sleeve locking means 8 from rotating upon pole 9 during the locking operation.

The end of fish line means 11 together with float means 23 and hook means 24 are cast or placed in a body of water designated 25 and the fish pole may be placed with its handle portion 13 supported by a mounting socket 36 as shown in Figure 1.

The above described arrangement of fish pole and fish-hook setting device provides for fishing, in which the fisherman may be away from his fish pole and in which a fish as illustrated in Figure 1 and designated 26 will, upon striking the baited hook 24, disengage trip arm means 18 by pulling upon fish line means 11. When trip arm means 18 has been tripped as shown in dotted lines in Figure 2, tension spring 10 causes the sleeve locking means 8 together with the end of fish line means 11, to be forcibly pulled to the position shown in solid lines in Figure 5, with trip arm means 18 being rotated in the direction of arrow 33. The forceful pull exerted upon fish line 11 in the retraction of tension spring 10 causes fish hook 24 to become firmly embedded within the mouth of fish 26; thus, holding said fish 26 until the fisherman is ready to land the fish.

An important advantage in my fish-hook setting device resides in the fact that the trip means will only be tripped by direct pull upon the fish line; such as will be exerted by a fish, which has taken the entire hook, in which case the fish is instantly and completely hooked by the forceful pull of the retracting spring-urged sleeve locking means 8.

Although my invention has been described, the terms used are to be deemed terms of description rather than terms of limitation, my intention being to retain the right to all mechanical equivalents of the structural elements depicted, provided they fall within the purview of the appended claims.

Having thus disclosed and revealed my invention, what I claim as new and desire to secure by Letters Patent is:

1. Fish-hook setting means comprising a fishing rod, a sleeve slidably mounted on said fishing rod, automatic sleeve locking means slidably mounted on said fishing rod, latch means secured to the said fishing rod, and trip arm means articulately secured to the said sleeve locking means and provided with locking hump means releasably engageable with said latch means, and a fish line, said trip arm means being provided with a fish line guide portion at its free terminus to permit tension on said fish line to release said trip arm means from locked position, and said trip arm means being further provided with a latch engaging cam portion to lock said trip arm means with said latch means when said sleeve locking means is slidably motivated.

2. Fish-hook setting means comprising a fishing rod, a sleeve slidably mounted on said fishing rod, sleeve locking means on said sleeve, latch means secured to said fishing rod, trip arm means articulately secured to said sleeve locking means and provided with locking hump means releasably engageable with said latch means, a fish line, said trip arm means being provided with a fish line guide portion at its free terminus to permit tension on said fish line to release said trip arm means from locked position, a guide strap secured to said fishing rod, and a locating bar secured to said sleeve engageable with said guide strap to guide said sleeve and prevent rotation of the same.

3. Fish-hook setting means comprising a fishing rod, a sleeve slidably mounted on said fishing rod, sleeve locking means on said sleeve, latch means secured to said fishing rod, trip arm means articulately secured to said sleeve locking means and provided with locking hump means releasably engageable with said latch means, a fish line, said trip arm means being provided with a fish line guide portion at its free terminus to permit tension on said fish line to release said trip arm means from locked position, said trip arm means being further provided with a latch engaging cam portion to lock said trip arm means with said latch means when said sleeve locking means is slidably motivated, a guide strap secured to said fishing rod, and a locating bar secured to said sleeve engageable with said guide strap to guide said sleeve and prevent rotation of the same.

4. Fish-hook setting means comprising a fishing rod, a sleeve slidably mounted on said fishing rod, sleeve locking means on said sleeve, latch means secured to said fishing rod, trip arm means articulately secured to said sleeve locking means and provided with locking hump means releasably engageable with said latch means, a fish line, said trip arm means being provided with a fish line guide portion at its free terminus to permit tension on said fish line to release said trip arm means from locked position, a guide strap secured to said fishing rod, a locating bar secured to said sleeve engageable with said guide strap to guide said sleeve and prevent rotation of the same, fish line winding post means secured to said locking sleeve means, and fish line attaching eye means secured to said locking sleeve means for releasably holding the free end of said fish line and an intermediate portion thereof.

5. Fish-hook setting means comprising a fishing rod, a sleeve slidably mounted on said fishing rod, sleeve locking means on said sleeve, latch means secured to said fishing rod, trip arm means articulately secured to said sleeve locking means and provided with locking hump means releasably engageable with said latch means, a fish line, said trip arm means being provided with a fish line guide portion at its free terminus to permit tension on said fish line to release said trip arm means from locked position, said trip arm means being further provided with a latch engaging cam portion to lock said trip arm means with said latch means when said sleeve locking means is slidably motivated, a guide strap secured to said fishing rod, a locating bar secured to said sleeve engageable with said guide strap to guide said sleeve and prevent rotation of the same, fish line winding post means secured to said locking sleeve means, and fish line attaching eye means secured to said locking sleeve means for releasably holding the free end of said fish line and an intermediate portion thereof.

6. Fish-hook setting means comprising a fishing rod, a sleeve slidably mounted on said fishing rod, sleeve locking means on said sleeve, latch means secured to said fishing rod, trip arm means articulately secured to said sleeve locking means and provided with locking hump means releasably engageable with said latch means, a fish line, said trip arm means being provided with a fish line guide portion at its free terminus to permit tension on said fish line to release said trip arm means from locked position, said trip arm means being further provided with a latch engaging cam portion to lock said trip arm means with said latch means when said sleeve locking means is slidably motivated, spring means anchored to said fishing rod and said sleeve locking means to maintain the same in inoperative position, a guide strap secured to said fishing rod, a locating bar secured to said sleeve engageable with said guide strap to guide said sleeve and prevent rotation of the same, fish line winding post means secured to said locking sleeve means, and fish line attaching eye means secured to said locking sleeve means for releasably holding the free end of said fish line and an intermediate portion thereof.

CARL R. HALL.

REFERENCES CITED

The following references are of record in the file of this patent:

UNITED STATES PATENTS

| Number | Name | Date |
|---|---|---|
| 263,638 | Wentworth | Aug. 29, 1882 |
| 272,232 | Gaume | Feb. 13, 1883 |
| 283,444 | Wentworth | Aug. 21, 1883 |